United States Patent
Shen et al.

(10) Patent No.: US 11,418,131 B2
(45) Date of Patent: Aug. 16, 2022

(54) VOLTAGE BALANCE CONTROL METHOD FOR FLYING-CAPACITOR MULTILEVEL CONVERTER

(71) Applicant: Delta Electronics (Shanghai) Co., Ltd., Shanghai (CN)

(72) Inventors: Guoqiao Shen, Shanghai (CN); Guojin Xu, Shanghai (CN); Ning He, Shanghai (CN); Jinfa Zhang, Shanghai (CN)

(73) Assignee: DELTA ELECTRONICS (SHANGHAI) CO., LTD., Shanghai (CN)

( * ) Notice: Subject to any disclaimer, the term of this patent is extended or adjusted under 35 U.S.C. 154(b) by 67 days.

(21) Appl. No.: 17/118,961

(22) Filed: Dec. 11, 2020

(65) Prior Publication Data

US 2021/0184594 A1 Jun. 17, 2021

(30) Foreign Application Priority Data

Dec. 13, 2019 (CN) .......................... 201911279470.5

(51) Int. Cl.
*H02M 7/483* (2007.01)
*H02M 7/493* (2007.01)
*H02M 3/07* (2006.01)

(52) U.S. Cl.
CPC .......... *H02M 7/4833* (2021.05); *H02M 3/077* (2021.05); *H02M 7/4837* (2021.05); *H02M 7/493* (2013.01)

(58) Field of Classification Search
CPC ........... H02M 3/07–078; H02M 3/1584–1586; H02M 7/483; H02M 7/4833; H02M 7/4837; H02M 7/493
See application file for complete search history.

(56) References Cited

U.S. PATENT DOCUMENTS

| | | |
|---|---|---|
| 9,160,232 B2 | 10/2015 | Thomas et al. |
| 2014/0266134 A1 | 9/2014 | Zhak et al. |

(Continued)

FOREIGN PATENT DOCUMENTS

| | | |
|---|---|---|
| CN | 104079196 A | 10/2014 |
| CN | 206272519 U | 6/2017 |

(Continued)

OTHER PUBLICATIONS

Gleissner, Michael et al., Design and Control of Fault-Tolerant Nonisolated Multiphase Multilevel DC-DC Converters for Automotive Power Systems, IEEE Transaction on Industry Applications, vol. 52, No. 2 Mar./Apr. 2016.

Zhou, Dehong et al., Model Predictive Control of a Nine-Level Internal Parallel Multilevel Converter With Phase-Shifted Pulsewidth Modulation, IEEE Transaction on Industrial Electronics, vol. 67, No. 11, Nov. 2020.

(Continued)

*Primary Examiner* — Fred E Finch, III
(74) *Attorney, Agent, or Firm* — Kirton McConkie; Evan R. Witt (57) ABSTRACT

A voltage balance control method for a flying-capacitor multilevel converter is provided. If the amplitude of the resultant current of the inductor currents from a plurality of output inductors is lower than or equal to a threshold current value, the flowing direction of the inductor current of at least one flying-capacitor multilevel branch circuit is controlled to be changed. Consequently, the problem of erroneously judging the current direction is avoided. Moreover, when the inductor current is low, the voltage of the flying capacitor is correspondingly controlled. Consequently, the voltage balance of the flying capacitor of the flying-capacitor multilevel converter can be achieved more easily.

8 Claims, 3 Drawing Sheets

(56) References Cited

U.S. PATENT DOCUMENTS

| | | | | |
|---|---|---|---|---|
| 2014/0293667 A1* | 10/2014 | Schroeder | ............. | H02M 7/483 |
| | | | | 363/60 |
| 2015/0084701 A1 | 3/2015 | Perreault et al. | | |
| 2015/0200602 A1* | 7/2015 | Narimani | ................ | H02M 1/12 |
| | | | | 363/37 |
| 2015/0280608 A1* | 10/2015 | Yoscovich | ............ | H02M 1/126 |
| | | | | 363/131 |
| 2016/0352251 A1* | 12/2016 | Li | ......................... | H02M 7/487 |
| 2017/0310105 A1* | 10/2017 | Shen | ..................... | H02M 7/483 |
| 2017/0310242 A1* | 10/2017 | Kifuji | ................... | H02M 7/483 |
| 2019/0363644 A1 | 11/2019 | Li et al. | | |

FOREIGN PATENT DOCUMENTS

| | | | |
|---|---|---|---|
| CN | 107306083 A | 10/2017 | |
| CN | 108011504 A | 5/2018 | |
| CN | 109412439 A | 3/2019 | |

OTHER PUBLICATIONS

Vahid Dargahi et al., New Flying-Capacitor-Based Multilevel Converter with Optimized Number of Switches and Capacitors Controlled with a New Logic-Form-Equation Based Active Voltage Balancing Technique, IEEE, 2016, pp. 1481-1488.

Vahid Dargahi et al., Logic-Equations Method for Active Voltage-control of a Flying-Capacitor Multilevel Converter Topology, IEEE, 2018, pp. 1291-1298.

\* cited by examiner

VOLTAGE BALANCE CONTROL METHOD FOR FLYING-CAPACITOR MULTILEVEL CONVERTER

FIELD OF THE INVENTION

The present disclosure relates to a voltage balance control method, and more particularly to a voltage balance control method for a flying-capacitor multilevel converter.

BACKGROUND OF THE INVENTION

Recently, the demands on the large-power converters are gradually grown. For example, multilevel converters are widely used in the high-voltage and large-power fields because the multilevel converters are able to obviously reduce the voltage stress of switching devices. Moreover, the benefits of the multilevel converters are obvious when output inductors are operated at a high frequency and a low voltage. Consequently, the volume of the output inductor is decreased, and the power loss is reduced. Moreover, the voltage change rate (dv/dt) of the multilevel converter is lower.

The well-known topologies of the multilevel converters are classified into three types, including a diode-clamped multilevel converter, a cascade multilevel converter and a flying-capacitor multilevel converter. In the diode-clamped multilevel converter, the main difficulty is to balance the divided voltages on the capacitors in the DC bus side of the converter. The cascade multilevel converter needs a plurality of independent DC power sources. In comparison with the diode-clamped multilevel converter and the cascade multilevel converter, the flying-capacitor multilevel converter has many benefits. For example, the flying-capacitor multilevel converter has simplified circuitry, less amount of components and a lot of redundant switching states.

As known, it is important to balance the voltages of the flying capacitors of the flying-capacitor multilevel converter. Generally, the flying-capacitor multilevel converter comprises a plurality of flying capacitors, an even number of switches and an output inductor. The even number of switches are serially connected between a positive electrode and a negative electrode of a DC bus to form a switch string. One end of the output inductor is connected with the midpoint of the switch string, and another end of the inductor is connected to an output terminal Two ends of each flying capacitor are connected to two points centrosymmetric about the midpoint in the switch string, and two switches are serially connected on each of these points.

In order to realize voltage balance of the flying capacitors, the charging and discharging procedures of the flying capacitors are controlled to maintain the anticipated voltage value of the flying capacitor. Generally, by adjusting the phases and duty ratios of the switches to generate a plurality of DC level voltages at the midpoint, the voltage or current of the output inductor is controlled. Consequently, the function of switching and regulating power can be achieved. Moreover, the duty ratio adjustment amount for controlling the voltage balance of the flying capacitor is related to the anticipated voltage change amount of the flying capacitor. In addition, the duty ratio adjusting direction is related to the current direction (i.e., the positive or negative sign of the current of the output inductor). In other words, the current direction of the output inductor is an important factor influencing the charging/discharging procedure of the flying capacitors and maintaining the voltage balance of the flying capacitors.

However, the conventional voltage balance control method still has some drawbacks. For example, in case that the multilevel converter is operated under a light load condition (i.e., the magnitude of the output inductor current is low, or the AC current is near the AC zero-crossing point of an AC/DC converter or a DC/AC converter), the ripple current generated by the high frequency switching may result in the repeat switching action of the current direction. Moreover, because of the above-mentioned issues, the control system may erroneously judge the current direction. On the other hand, when the magnitude of the output inductor current is low, it is difficult to regulate the voltage of the flying capacitor rapidly. Moreover, this problem limits the applications of the flying-capacitor multilevel converter.

Therefore, there is a need of providing a voltage balance control method for a flying-capacitor multilevel converter in order to overcome the above drawbacks.

SUMMARY OF THE INVENTION

An object of the present disclosure provides a voltage balance control method for a flying-capacitor multilevel converter in order to overcome the drawbacks of the conventional technologies and achieve the inductor voltage balance control for the flying capacitor.

In accordance with an aspect of the present disclosure, a voltage balance control method for controlling a flying-capacitor multilevel converter is provided. The flying-capacitor multilevel converter includes a plurality of flying-capacitor multilevel branch circuits connected in parallel. Each of the plurality of flying-capacitor multilevel branch circuits includes at least one flying capacitor, an even number of switches and an output inductor. Each of the plurality of flying-capacitor multilevel branch circuits has an output inductor current flowing through the output inductor. The voltage balance control method includes the following steps. In a step (a), an even number of control signals are generated to control the even number of switches of each of the plurality of flying-capacitor multilevel branch circuits correspondingly. Then, a step (b) is performed to judge whether a voltage of each of the at least one flying capacitor satisfies a preset condition, wherein if the voltage on each of the at least one flying capacitor satisfies the preset condition, then jumping to step (e), and if the voltage on each of the at least one flying capacitor does not satisfy the preset condition, then jumping to step (c). In a step (c), the step (c) is performed to judge whether an amplitude of a resultant current representing the sum of the output inductor current of the plurality of flying-capacitor multilevel branch circuits of the plurality of flying-capacitor multilevel branch circuits is lower than or equal to a threshold current value, or judge whether a resultant current control given value of the flying-capacitor multilevel converter is lower than or equal to the threshold current value, wherein if the amplitude of the resultant current or the resultant current control given value is lower than or equal to the threshold current value, then jumping to step (d), and if the amplitude of the resultant current or the resultant current control given value is higher than the threshold current value, then jumping to step (e). In a step (d), the step (d) is performed to control a flowing direction of the output inductor current of at least one of the plurality of flying-capacitor multilevel branch circuits to be opposite to a flowing direction of the resultant current by controlling the even number of switches of each of the plurality of flying-capacitor multilevel branch circuits. In a step (e), the voltage on each of the at least one flying capacitors is controlled to be equal to a voltage reference according to the output inductor current of each of the plurality of flying-capacitor multilevel branch circuits and by controlling the even number of switches of each of the plurality of flying-capacitor multilevel branch circuits, and the step (b) is repeatedly done.

The above contents of the present disclosure will become more readily apparent to those ordinarily skilled in the art after reviewing the following detailed description and accompanying drawings, in which:

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1:
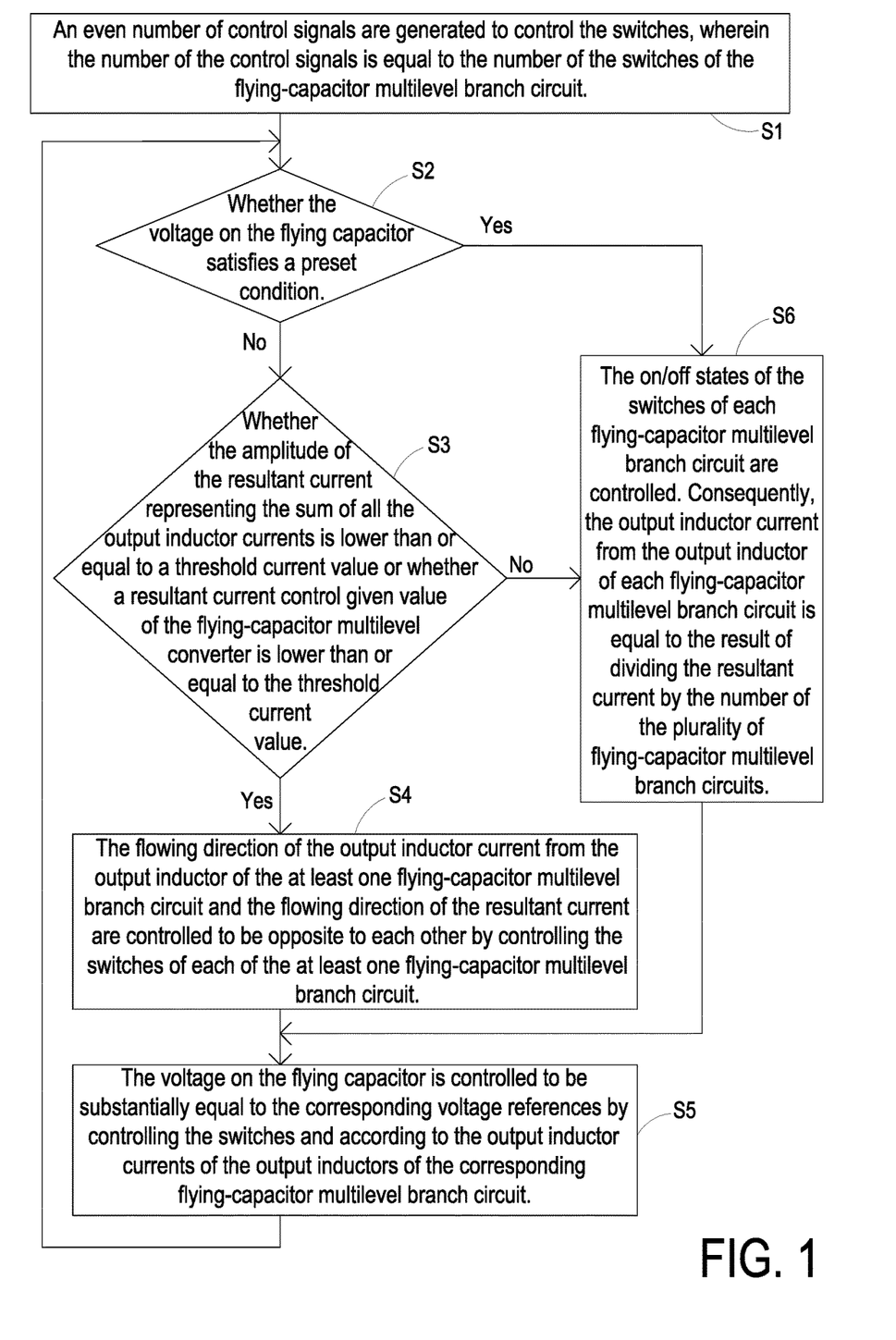
FIG. 1 is a flowchart illustrating a voltage balance control method for a flying-capacitor multilevel converter according to a first embodiment of the present disclosure.
Figure 2:
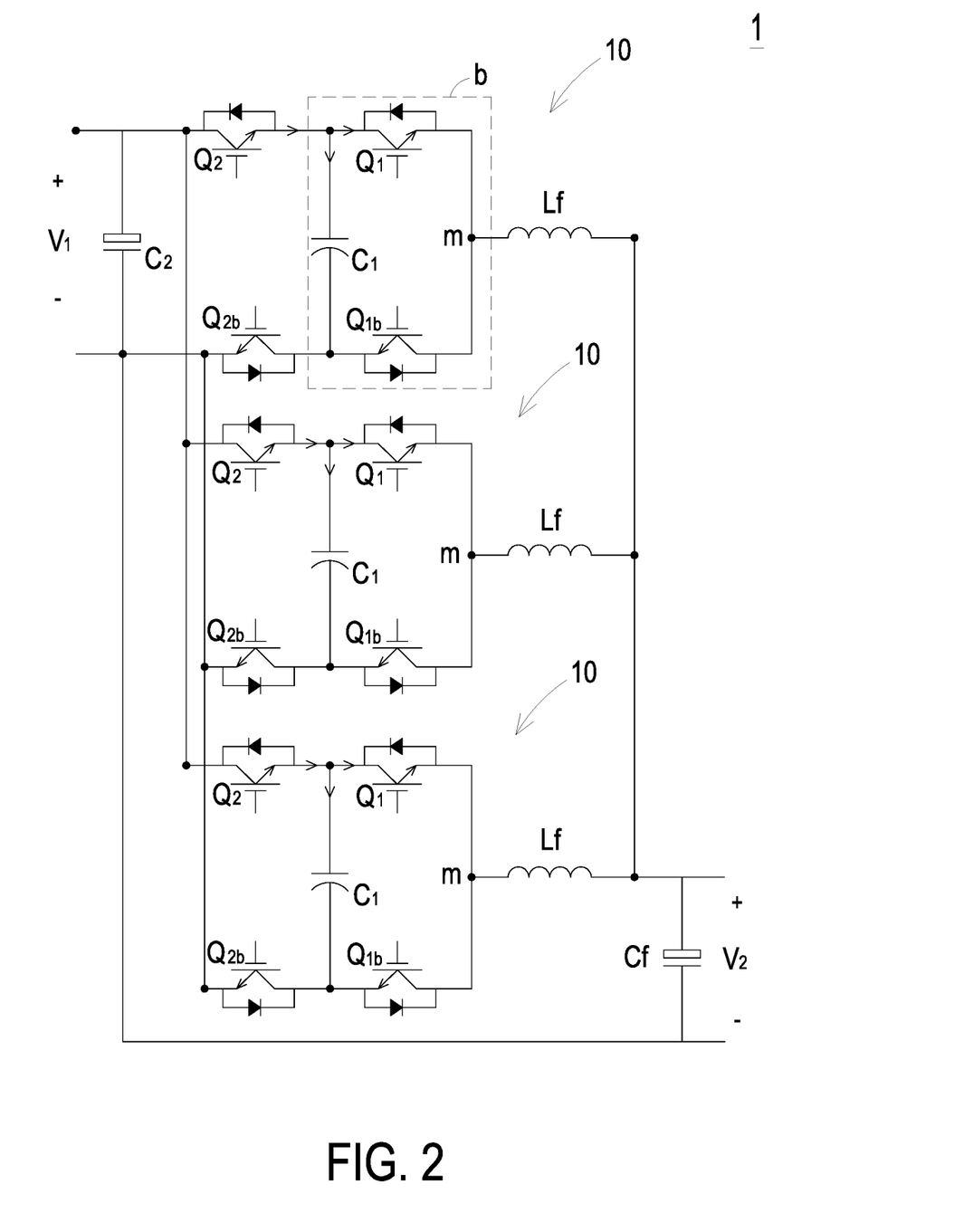
FIG. 2 is a schematic circuit diagram illustrating an exemplary flying-capacitor multilevel converter using the voltage balance control method of the present disclosure.

Please refer to FIGS. 1 and 2. FIG. 1 is a flowchart illustrating a voltage balance control method for a flying-capacitor multilevel converter according to a first embodiment of the present disclosure. FIG. 2 is a schematic circuit diagram illustrating an exemplary flying-capacitor multi-level converter using the voltage balance control method of the present disclosure. The voltage balance control method is applied to the flying-capacitor multilevel converter 1. In an embodiment, the flying-capacitor multilevel converter 1 includes a plurality of flying-capacitor multilevel branch circuits 10. The plurality of flying-capacitor multilevel branch circuits 10 are connected with each other in parallel. Moreover, the plurality of flying-capacitor multilevel branch circuits 10 receive a DC input voltage V1 from a DC voltage source (not shown in figure) and outputs an output voltage V2. In the embodiment of FIG. 2, the flying-capacitor multilevel converter 1 includes three flying-capacitor multilevel branch circuits 10.

In the embodiment of FIG. 2, the flying-capacitor multilevel branch circuit 10 is a flying-capacitor three-level branch circuit including two basic units b and an output inductor Lf.

Each flying-capacitor multi-level branch circuit 10 includes two flying capacitors C1, C2, an even number of switches and an output inductor LE The even number of switches are serially connected between a positive electrode and a negative electrode of the DC voltage source. For example, the even number of switches include two serially-connected switches Q1 and Q2 and two serially-connected switches Q1b and Q2b. The first basic unit b of the two basic units b includes the flying capacitor C2 and the two switches Q2 and Q2b. The second basic unit b of the two basic units b includes the flying capacitor C1 and the two switches Q1 and Q1b. The two serially-connected switches Q1 and Q2 and the two serially-connected switches Q1b and Q2b are connected to a midpoint m. In each of the two basic units b, a first terminal and a second terminal of each flying capacitor are connected with two complementary switches respectively. For example, the first terminal and the second terminal of the flying capacitor C1 are respectively connected with the switches Q1 and Q1b. Moreover, the first terminal and the second terminal of the flying capacitor C2 are respectively connected with the switches Q2 and Q2b.

In some embodiments, the plurality of switches Q1, Q2, Q1b and Q2b have the same switching period respectively. In each of the two basic units b, the on/off states of the two switches are complementary to each other. For example, the on/off states of the switch Q1 is complementary to the on/off states of the switch Q1b, and the on/off states of the switch Q2 is complementary to the on/off states of the switch Q2b.

Each of the two basic units b includes an input terminal and an output terminal. As shown in FIG. 2, each of the plurality of flying-capacitor multi-level branch circuits 10 includes two basic units b including the first basic unit b and the second basic unit b. The input terminals of the first basic unit b are electrically connected with a DC voltage source to receive the DC input voltage V1. The output terminals of the first basic unit b are connected with the input terminals of the corresponding second basic unit b respectively. Consequently, the first basic unit b and the corresponding second basic unit b are connected with each other in cascade. The first terminal and the second terminal of the flying capacitor C2 are connected with the input terminals of the first basic unit b in parallel. The first terminal and the second terminal of the flying capacitor C2 are respectively connected with a first terminal of the switch Q2 and a first terminal of the switch Q2b. The second terminals of the two complementary switches Q2 and Q2b are connected with the input terminals of the second basic unit b. The first terminal and the second terminal of the flying capacitor C1 of the second basic unit b are connected with the input terminals of the second basic unit b in parallel. The first terminal and the second terminal of the flying capacitor C1 are respectively connected with a first terminal of the switch Q1 and a first terminal of the switch Q1b. The output terminal of each the second basic unit b is connected with a first terminal of the corresponding output inductor Lf. Second terminals of the output inductors Lf of all the plurality of flying-capacitor multi-level branch circuits 10 are connected with each other to form the output terminal of the flying-capacitor multilevel converter 1.

The switches of the first basic unit b and the second basic unit b are controlled, so that a plurality of DC level voltages are generated at the output terminals of the corresponding basic units b. The first terminal of the output inductor Lf is connected with the midpoint m of the even number of switches Q1, Q2, Q1b and Q2b. The output inductor Lf receives the output current from the corresponding basic unit b and generates the output inductor current of the flying-capacitor multi-level branch circuit 10. Because of the paralleled flying-capacitor multilevel branch circuits 10, a resultant current is generated as the sum of the output inductor currents of the plurality of flying-capacitor multi-level branch circuits 10. The flying-capacitor multilevel converter 1 further includes an output filtering capacitor Cf, and the resultant current is subjected to a low pass filtering operation by the output filtering capacitor Cf, an output voltage V2 is outputted. In one embodiment, the input voltage V1 is higher than the output voltage V2.

Figure 3:
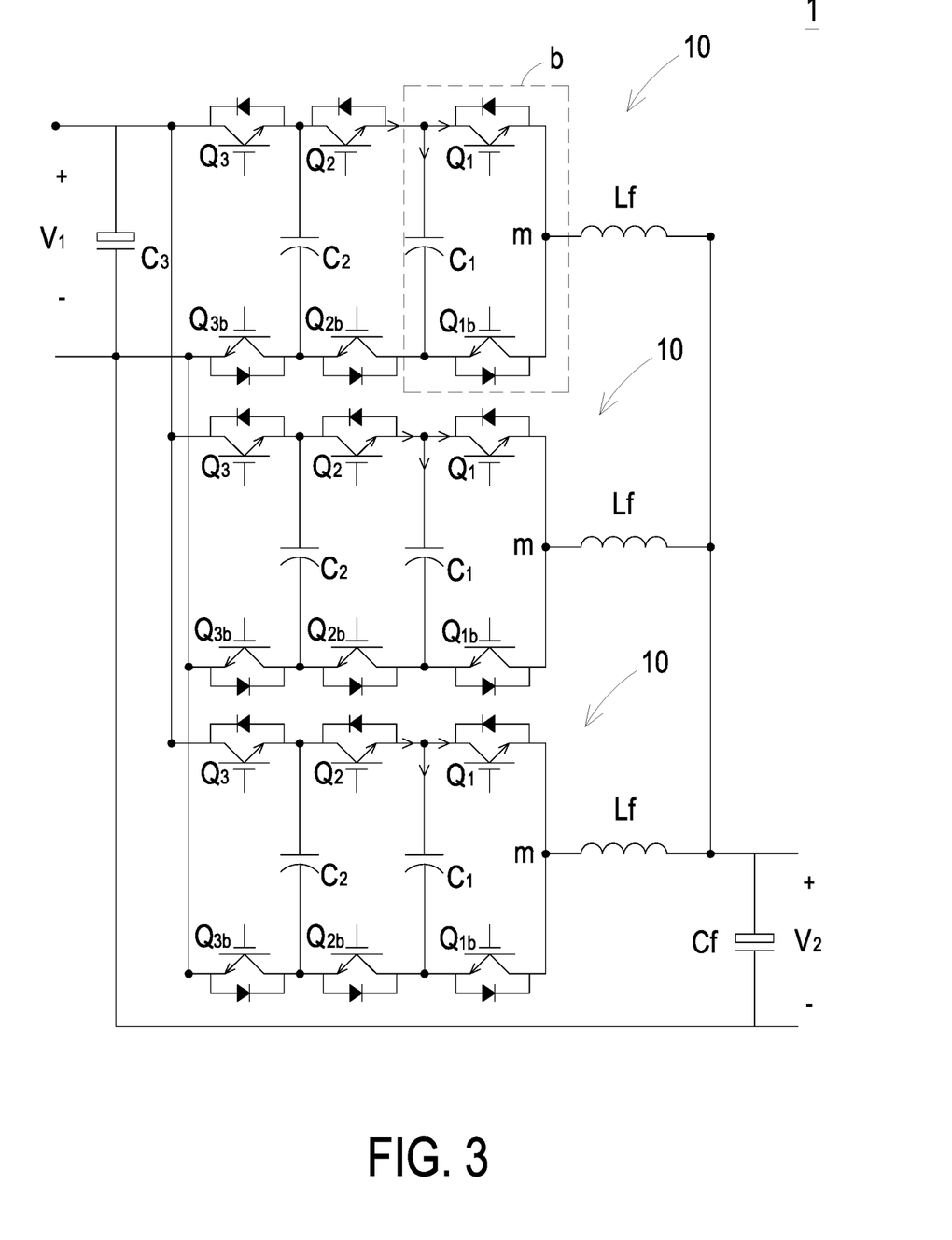
FIG. 3 is a schematic circuit diagram illustrating another exemplary flying-capacitor multilevel converter using the voltage balance control method of the present disclosure.

FIG. 3 is a schematic circuit diagram illustrating another exemplary flying-capacitor multilevel converter using the voltage balance control method of the present disclosure. As shown in FIG. 3, the flying-capacitor multilevel branch circuit 10 is a flying-capacitor four-level branch circuit including three basic units b and an output inductor Lf. The difference between the flying-capacitor multilevel branch circuit 10 in FIG. 2 and the flying-capacitor multilevel branch circuit 10 in FIG. 3 is that the flying-capacitor multilevel branch circuit 10 in FIG. 3 further includes a third basic unit b. The output terminal of the second basic unit b is connected with the input terminal of the third basic unit b. The output terminal of the third basic unit b is connected with the first terminal of the output inductor Lf. The components in the third basic unit b are similar to that in the first basic unit b or second basic unit b, and will not be described repeatedly.

It is noted that the flying-capacitor multilevel branch circuit 10 is not limited to the flying-capacitor three-level branch circuit or the flying-capacitor four-level branch circuit. The number of the basic units b of the flying-capacitor multilevel branch circuit 10 is also not restricted.

In an embodiment, the flying-capacitor multilevel converter 1 further includes a control unit (not shown). The control unit is connected with the switches of the flying-capacitor multilevel branch circuits 10. During the control operations of the flying-capacitor multilevel converter 1, the control unit generates control signals to control the switches. The number of the control signals is equal to the number of the switches in one of the plurality flying-capacitor multilevel branch circuits 10, for example, as shown in FIG. 2, four control signals are generated to control the switches Q1, Q2, Q1b and Q2b respectively. Thereby, the output inductor current of the output inductor Lf is generated and the flowing direction of the output inductor current is further controlled. Moreover, as controlling the switches Q1, Q2, Q1b and Q2b, the corresponding voltages are generated on the flying capacitor C1 and the flying capacitor C2 respectively.

Moreover, the flying-capacitor multilevel converter 1 further includes a detection unit (not shown). The detection unit is connected with the flying capacitor C1, the flying capacitor C2, the output inductors Lf and the control unit. The detection unit is used for detecting the voltage on the flying capacitor C1, the voltage on the flying capacitor C2 and the resultant current of the output inductor currents from the plurality of output inductors Lf. In addition, the detection unit provides the detection results to the control unit and the control unit generates the corresponding control signals according to the detection results.

Please refer to FIG. 1 again. The voltage balance control method for the flying-capacitor multilevel converter 1 includes the following steps.

Firstly, in the step S1, an even number of control signals are generated to control the switches, wherein the number of the control signals is equal to the number of the switches of the flying-capacitor multilevel branch circuit 10. Consequently, the output inductor current flowing through the output inductor Lf is generated, thereby the resultant current representing the sum of all the output inductor currents is generated, and a voltage on the two terminals of the flying capacitor C1 and a voltage on the two terminals of the flying capacitor C2 are generated.

Then, a step S2 is performed to detect the voltage on the flying capacitors and judge whether the voltage on the flying capacitor C1 satisfies a first preset condition and the voltage on the flying capacitor C2 satisfies a second preset condition. When amplitude of the voltage on the flying capacitor C1 is within a first preset voltage range, and the voltage on the flying capacitor C2 is within a second preset voltage range, the preset condition is satisfied. In one embodiment, the first preset voltage range and the second preset voltage range are ranges between [91%, 105%] of a voltage reference.

In the embodiment of the flying-capacitor P-level branch circuit, the sequence number of the flying capacitor connected with the switches being closest to the midpoint is 1, and that of the next closest is 2, and the sequence number of the flying capacitor apart from the input capacitor is represented as P−2, wherein P is a natural number larger than two. The voltage reference of the flying capacitor is equal to the input voltage V1 multiplied by a sequence number, and then divided by (P−1).

In the embodiment of FIG. 2, the flying-capacitor multilevel branch circuit 10 of FIG. 2 is a flying-capacitor three-level branch circuit, the number of the flying capacitor apart from the input capacitor is one, wherein the flying capacitor apart from the input capacitor is the flying capacitor C1. That is, in this embodiment, P is equal to three. The flying capacitor C1 is the first flying capacitor of the plurality flying capacitor. Consequently, the flying capacitor C1 includes a sequence number, wherein the sequence number of the flying capacitor C1 is one. The voltage reference of the flying capacitor C1 is equal to the input voltage V1 multiplied by the sequence number, and then divided by (P−1). That is, in this embodiment, the voltage reference of the flying capacitor C1 is equal to the input voltage V1 multiplied by one, and then divided by two. The flying capacitor C2 is the second flying capacitor of the plurality flying capacitor. Consequently, the flying capacitor C2 includes a sequence number, wherein the sequence number of the flying capacitor C2 is two. The voltage reference of the flying capacitor C2 is equal to the input voltage V1 multiplied by the sequence number, and then divided by (P−1). That is, in this embodiment, the voltage reference of the flying capacitor C2 is equal to the input voltage V1 multiplied by two, and then divided by two. The voltage reference of the flying capacitor C2 is equal to the input voltage V1. The flying capacitor C2 is the input capacitor of the flying-capacitor multilevel branch circuit 10.

In the embodiment of FIG. 3, the voltage reference of the flying capacitor C1 is different to the voltage reference of the flying capacitor C2. The flying-capacitor multilevel branch circuit 10 of FIG. 3 is a flying-capacitor four-level branch circuit. In the embodiment of FIG. 3, the number of the flying capacitor apart from the input capacitor is two, wherein the flying capacitors apart from the input capacitor are the flying capacitor C1 and the flying capacitor C2. That is, in this embodiment, P is equal to four. The flying capacitor C1 is the first flying capacitor of the plurality flying capacitor. Consequently, the flying capacitor C1 includes a sequence number, wherein the sequence number of the flying capacitor C1 is one. The voltage reference of the flying capacitor C1 is equal to the input voltage V1 multiplied by the sequence number, and then divided by (P−1). That is, in this embodiment, the voltage reference of the flying capacitor C1 is equal to the input voltage V1 multiplied by one, and then divided by three. The flying capacitor C2 is the second flying capacitor of the plurality flying capacitor. Consequently, the flying capacitor C2 includes a sequence number, wherein the sequence number of the flying capacitor C2 is two. The voltage reference of the flying capacitor C2 is equal to the input voltage V1 multiplied by the sequence number, and then divided by (P−1). That is, in this embodiment, the voltage reference of the flying capacitor C2 is equal to the input voltage V1 multiplied by two, and then divided by three. The flying capacitor C3 is the third flying capacitor of the plurality flying capacitor. Consequently, the flying capacitor C3 includes a sequence number, wherein the sequence number of the flying capacitor C3 is three. The voltage reference of the flying capacitor C3 is equal to the input voltage V1 multiplied by the sequence number, and then divided by (P−1). That is, in this embodiment, the voltage reference of the flying capacitor C3 is equal to the input voltage V1 multiplied by three, and then divided by three. The voltage reference of the flying capacitor C3 is equal to the input voltage V1. The flying capacitor C3 is the input capacitor of the flying-capacitor multilevel branch circuit 10.

In the step S2, the voltage on the flying capacitor C1 and the voltage on the flying capacitor C2 are charged or discharged, and the amplitude of the voltage on the flying capacitor C1 and the amplitude of the voltage on the flying capacitor C2 are maintained within the respective preset voltage range. That is, the amplitude of the voltage on the flying capacitor C1 and the amplitude of the voltage on the flying capacitor C2 are maintained within [91%, 105%] of the respective voltage reference. Because the switches of each basic unit b are complementary to each other, the bear voltage of each switch is the difference between the voltage on the corresponding flying capacitor and the voltage on the next flying capacitor. The bear voltage of each switch is equal to the input voltage V1 divided by the number of the flying capacitor apart from the input capacitor.

If the judging result of the step S2 is not satisfied, a step S3 is performed. Namely, if the voltage of the flying capacitor C1 or the voltage of the flying capacitor C2 fails to satisfy the preset condition, the step S3 is performed. The step S3 is performed to judge whether the amplitude of the resultant current representing the sum of all the output inductor currents is lower than or equal to a threshold current value or judge whether a resultant current control given value of the flying-capacitor multilevel converter 1 is lower than or equal to the threshold current value. The resultant current control given value of the flying-capacitor multilevel converter 1 is outputted from the control unit. In an embodiment, the sum of all the output inductor currents is equal to the resultant current control given value of the flying-capacitor multilevel converter 1. In an embodiment, the threshold current value is a preset percentage of the rated current value of the flying-capacitor multilevel branch circuit 10. For example, but not limited to, the threshold current value is 10% of the rated current value of the flying-capacitor multilevel branch circuit 10.

If the judging result of the step S3 is satisfied, it means that the flying-capacitor multilevel converter 1 is in a light load condition. Namely, if the amplitude of the resultant current or the resultant current control given value is lower than or equal to the threshold current value, the flying-capacitor multilevel converter 1 is in the light load condition. Then, a step S4 is performed. In the step S4, the flowing direction of the output inductor current from the output inductor Lf of the at least one flying-capacitor multilevel branch circuit 10 and the flowing direction of the resultant current are controlled to be opposite to each other by controlling the switches Q1, Q2, Q1b and Q2b of each of the at least one flying-capacitor multilevel branch circuit 10.

After the step S4, a step S5 is performed. The voltage on the flying capacitor C1 and the voltage on the flying capacitor C2 are controlled to be substantially equal to the corresponding voltage references by controlling the switches Q1, Q2, Q1b and Q2b and according to the output inductor currents of the output inductors Lf of the corresponding flying-capacitor multilevel branch circuit 10.

After the step S5, the step S2 is repeatedly done. And then repeat the above steps.

Please refer to the step S4 again. Since the flowing direction of the output inductor current from the output inductor Lf of the at least one flying-capacitor multilevel branch circuit 10 is opposite to the flowing direction of the resultant current, the efficacy of circulating the current between the plurality of parallel-connected flying-capacitor multilevel branch circuits 10 is enhanced. Consequently, the voltage regulation capabilities of the flying capacitors C1 and C2 are improved. Moreover, the current circulation efficacy between the plurality of parallel-connected flying-capacitor multilevel branch circuits 10 is helpful to the internal balance of the flying-capacitor multilevel converter 1 without changing the magnitude of the resultant current of the output inductor currents from the plurality of output inductors Lf.

Moreover, for reducing the power loss of the internal components of the flying-capacitor multilevel converter 1, the output inductor current from the output inductor Lf is controlled to have the lower amplitude.

Further in the step S4, the flying-capacitor multilevel branch circuit 10 having the flowing direction of the output inductor current of the output inductor Lf opposite to the resultant current can be referred to a first flying-capacitor multilevel branch circuit 10. The first flying-capacitor multilevel branch circuit 10 has a first inductor current value. The first inductor current value is equal to the result of the threshold current value divided by the number of the plurality of flying-capacitor multilevel branch circuits 10.

The remaining flying-capacitor multilevel branch circuits 10 except for the first flying-capacitor multilevel branch circuit 10 can be referred to a second flying-capacitor multilevel branch circuit 10. The second flying-capacitor multilevel branch circuit 10 has flowing direction of the output inductor currents outputted from the output inductors Lf identical to the flowing direction of the resultant current. In an embodiment, the output inductor current of the output inductor Lf of the second flying-capacitor multilevel branch circuit 10 has a second inductor current value. The second inductor current value is equal to the sum of all the first inductor current value and the resultant current of the output inductor currents from the plurality of output inductors Lf divided by the number of the second flying-capacitor multilevel branch circuit 10.

Moreover, in the step S4, the number A of the first flying-capacitor multilevel branch circuit 10 having flowing direction of the output inductor current of the output inductor Lf opposite to the resultant current may be calculated according to the following function:

$$A = \mathrm{CEIL}(X) = \mathrm{CEIL}\left(\frac{n}{2}\left(1 - \frac{|I_{ref}|}{I_{nom}} \times \frac{1}{I_{th}}\right)\right),$$

In the above function, n is the number of the plurality of flying-capacitor multilevel branch circuits 10, $I_{ref}$ is the resultant current of the output inductor currents from the plurality of output inductors Lf, $I_{nom}$ is the rated current value of the corresponding flying-capacitor multilevel branch circuit 10, and $I_{th}$ is a ratio of the threshold current value to the rated current value. Function CEIL(X) is used to obtain the minimum integer larger than or equal to X, of which X is the independent variable. For example, if X=3.5, CEIL(X)=4. Moreover, if X=1.5, CEIL(X)=2. It is noted that the value of X is not restricted.

Still refer to the step S2, if the judging result of the step S2 is satisfied, it means that the voltage on the flying capacitor C1 and the voltage on the flying capacitor C2 satisfy the preset condition for the flying-capacitor multilevel converter 1. Namely, if amplitude of the voltage on the flying capacitor C1 and the voltage on the flying capacitor C2 are within the preset voltage range, the flying-capacitor multilevel converter 1 is in a normal working state. Then, a step S6 is performed to control the on/off states of the switches Q1, Q2, Q1b and Q2b of each flying-capacitor multilevel branch circuit 10. Consequently, the output inductor current from the output inductor Lf of each flying-capacitor multilevel branch circuit 10 is equal to the result of dividing the resultant current by the number of the plurality of flying-capacitor multilevel branch circuits 10. After the step S6, the step S5 is done.

Still refer to the step S3, if the judging result of the step S3 is not satisfied, the step S6 is performed. Namely, if the amplitude of the resultant current is greater than the threshold current value or the amplitude of the resultant current control given value is greater than the threshold current value, the step S6 is performed.

From the above descriptions, the present disclosure provides a voltage balance control method for a flying-capacitor multilevel converter. If the amplitude of the resultant current of the output inductor currents from the plurality of output inductors is lower than or equal to a threshold current value, the output inductor current of at least one flying-capacitor multilevel branch circuit is controlled to change the voltage on the flying capacitor. In the low load condition, the flowing direction of the output inductor current of at least one flying-capacitor multilevel branch circuit is changed. Consequently, the problem of erroneously judging the current direction is avoided according to the above control method. Moreover, when the output inductor current is low, the voltage of the flying capacitor is correspondingly controlled. Consequently, the voltage balance of the flying capacitor of the flying-capacitor multilevel converter can be achieved more easily. Since the flowing direction of the output inductor current from the output inductor of at least one flying-capacitor multilevel branch circuit is opposite to the flowing direction of the output inductor currents from the output inductors of the other flying-capacitor multilevel branch circuits, the efficacy of circulating the current between the plurality of parallel-connected flying-capacitor multilevel branch circuits is enhanced. Moreover, the current circulation efficacy between the plurality of parallel-connected flying-capacitor multilevel branch circuits is helpful to the internal balance of the flying-capacitor multilevel converter without changing the magnitude of the resultant current of the output inductor currents from the plurality of output inductors.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A voltage balance control method for controlling a flying-capacitor multilevel converter, the flying-capacitor multilevel converter comprising a plurality of flying-capacitor multilevel branch circuits connected in parallel, each of the plurality of flying-capacitor multilevel branch circuits comprising at least one flying capacitor, an even number of switches and an output inductor, and each of the plurality of flying-capacitor multilevel branch circuits having an output inductor current flowing through the output inductor, and the voltage balance control method comprising steps of:

(a) generating an even number of control signals to control the even number of switches of each of the plurality of flying-capacitor multilevel branch circuits correspondingly;

(b) judging whether a voltage on each of the at least one flying capacitor satisfies a preset condition, wherein if the voltage on each of the at least one flying capacitor satisfies the preset condition, then jumping to step (e), and if the voltage on each of the at least one flying capacitor does not satisfy the preset condition, then jumping to step (c);

(c) judging whether an amplitude of a resultant current representing the sum of the output inductor current of the plurality of flying-capacitor multilevel branch circuits of the plurality of flying-capacitor multilevel branch circuits is lower than or equal to a threshold current value or judging whether a resultant current control given value of the flying-capacitor multilevel converter is lower than or equal to the threshold current value, wherein if the amplitude of the resultant current or the resultant current control given value is lower than or equal to the threshold current value, then jumping to step (d), and if the amplitude of the resultant current or the resultant current control given value is higher than the threshold current value, then jumping to step (e);

(d) controlling a flowing direction of the output inductor current of at least one of the plurality of flying-capacitor multilevel branch circuits to be opposite to a flowing direction of the resultant current by controlling the even number of switches of each of the plurality of flying-capacitor multilevel branch circuits; and (e) controlling the voltage on each of the at least one flying capacitor to be equal to a voltage reference according to the output inductor current of each of the plurality of flying-capacitor multilevel branch circuits and by controlling the even number of switches of each of the plurality of flying-capacitor multilevel branch circuits, and then performing the step (b) again.

2. The voltage balance control method according to claim 1, wherein if the voltage of each of the at least one flying capacitor is within a preset voltage range in the step (b), the preset condition is satisfied.

3. The voltage balance control method according to claim 2, the preset voltage range is a range between [91%, 105%] of the voltage reference.

4. The voltage balance control method according to claim 1, wherein in the step (c), the threshold current value is a preset percentage of a rated current value of each of the plurality of the flying-capacitor multilevel branch circuits.

5. The voltage balance control method according to claim 1, wherein in the step (d), at least one of the plurality of flying-capacitor multilevel branch circuits having the flowing direction of the output inductor current opposite to the resultant current is referred to at least one first flying-capacitor multilevel branch circuit, the number of the at least one first flying-capacitor multilevel branch circuits is calculated according to a following function:

$$A = \text{CEIL}(X) = \text{CEIL}\left(\frac{n}{2}\left(1 - \frac{|I_{ref}|}{I_{nom}} \times \frac{1}{I_{th}}\right)\right),$$

wherein A is the number of the at least one first flying-capacitor multilevel branch circuit, n is the number of the plurality of flying-capacitor multilevel branch circuits, $I_{ref}$ is the resultant current, $I_{nom}$ is a rated current value of the flying-capacitor multilevel converter, and $I_{th}$ is a ratio of the threshold current value to the rated current value, wherein the function CEIL(X) is used to obtain a minimum integer larger than or equal to X, of which X is the independent variable.

6. The voltage balance control method according to claim 5, wherein the first flying-capacitor multilevel branch circuit has a first inductor current value, and the first inductor current value is equal to a result of the threshold current value divided by the number of the plurality of flying-capacitor multilevel branch circuits.

7. The voltage balance control method according to claim 5, wherein the plurality of flying-capacitor multilevel branch circuits further comprise at least one second flying-capacitor multilevel branch circuit, wherein the flowing direction of the output inductor current of the at least one second flying-capacitor multilevel branch circuit is identical to the flowing direction of the resultant current.

8. The voltage balance control method according to claim 1, wherein each of the plurality of flying-capacitor multilevel branch circuits comprises a plurality of basic units connected with each other in cascade and the output inductor, each of the plurality of basic units comprises corresponding one of the at least one flying capacitor and corresponding two of the even number of switches, wherein in each of the plurality of basic units, a first terminal and a second terminal of each of the at least one flying capacitor are connected with the corresponding two of the even number of switches respectively.

* * * * *